United States Patent [19]

McCarley

[11] Patent Number: 4,477,873
[45] Date of Patent: Oct. 16, 1984

[54] CHANNEL MONITOR FOR CONNECTION TO CHANNEL LINES

[75] Inventor: Edgar L. McCarley, Glendale, Ariz.

[73] Assignee: International Telephone & Telegraph Corporation, New York, N.Y.

[21] Appl. No.: 373,254

[22] Filed: Apr. 29, 1982

[51] Int. Cl.[3] .............................................. G06F 11/34
[52] U.S. Cl. ..................................................... 364/200
[58] Field of Search ... 364/200 MS File, 900 MS File

[56] References Cited

U.S. PATENT DOCUMENTS 4,213,178 7/1980 Diez et al. ............................. 364/200

*Primary Examiner*—Raulfe B. Zache

*Attorney, Agent, or Firm*—T. E. Kristofferson; J. M. May

[57] ABSTRACT

Apparatus for monitoring, in real time, the I/O channel activity between a computer and a locally attached device. The apparatus does not interfere with the operation of the I/O channel while monitoring its activity and records events and sequences of events as they occur on the channel. An operator selects the events and sequences of events to be recorded and detected conditions are stored in memory. In particular, the apparatus only detects selected signals having a period greater than a predetermined value. If this occurs, the channel Tag and Bus lines being monitored are recorded in memory.

6 Claims, 8 Drawing Figures

CHANNEL MONITOR FOR CONNECTION TO CHANNEL LINES

BACKGROUND OF THE INVENTION

For companies that manufacture and service electronic equipment and systems utilizing such equipment, supporting that equipment in the field has become a costly and complex problem.

When a customer's equipment fails, it is mandatory that the manufacturer or supplier of the equipment remedy the failure as quickly as possible. In the case of an electronic system and, in particular, wherein the manufacturer providing the service has only supplied a portion of the overall system, i.e., the video display/controller portion of a communications system which includes a computer provided by a third party manufacturer, additional service problems arise since it is desirable to do the testing on a real-time basis. A further problem may arise in that the customer or service representative may not be certain where the problem is, i.e., in the video display provided by the manufacturer thereof or in the computer itself.

Thus what is desired is a real-time, inexpensive and rapid test procedure for monitoring computer channels to detect and isolate any faults on the channel.

SUMMARY OF THE PRESENT INVENTION

Apparatus for monitoring, in real-time, the activity on a computer I/O (input/output) channel. The apparatus does not interfere with the I/O channel operation during monitoring and records events and sequences of events as they occur on the channel. An operator selects the events and sequences of events to be recorded and detected conditions are stored in memory. The apparatus only detects and records signals having a period greater than a minimum period. If the signal period is greater than the minimum period but less than a maximum period, a glitch is detected and recorded in memory. If the signal period is greater than the minimum period and also greater than the maximum period, a signal is generated which causes the channel lines being monitored to be recorded in memory.

It is an object of the present invention to provide improved computer I/O channel monitoring apparatus.

It is a further object of the present invention to provide real-time computer I/O channel monitoring apparatus.

It is still a further object of the present invention to provide channel monitoring apparatus wherein an operator can select the events and sequences of events to be detected and recorded in memory.

BRIEF DESCRIPTION OF THE DRAWINGS

For a better understanding of the invention as well as other objects and further features thereof, reference is made to the following description which is to be read in conjunction with the drawing wherein.

DESCRIPTION OF THE PREFERRED EMBODIMENT

Figure 1:
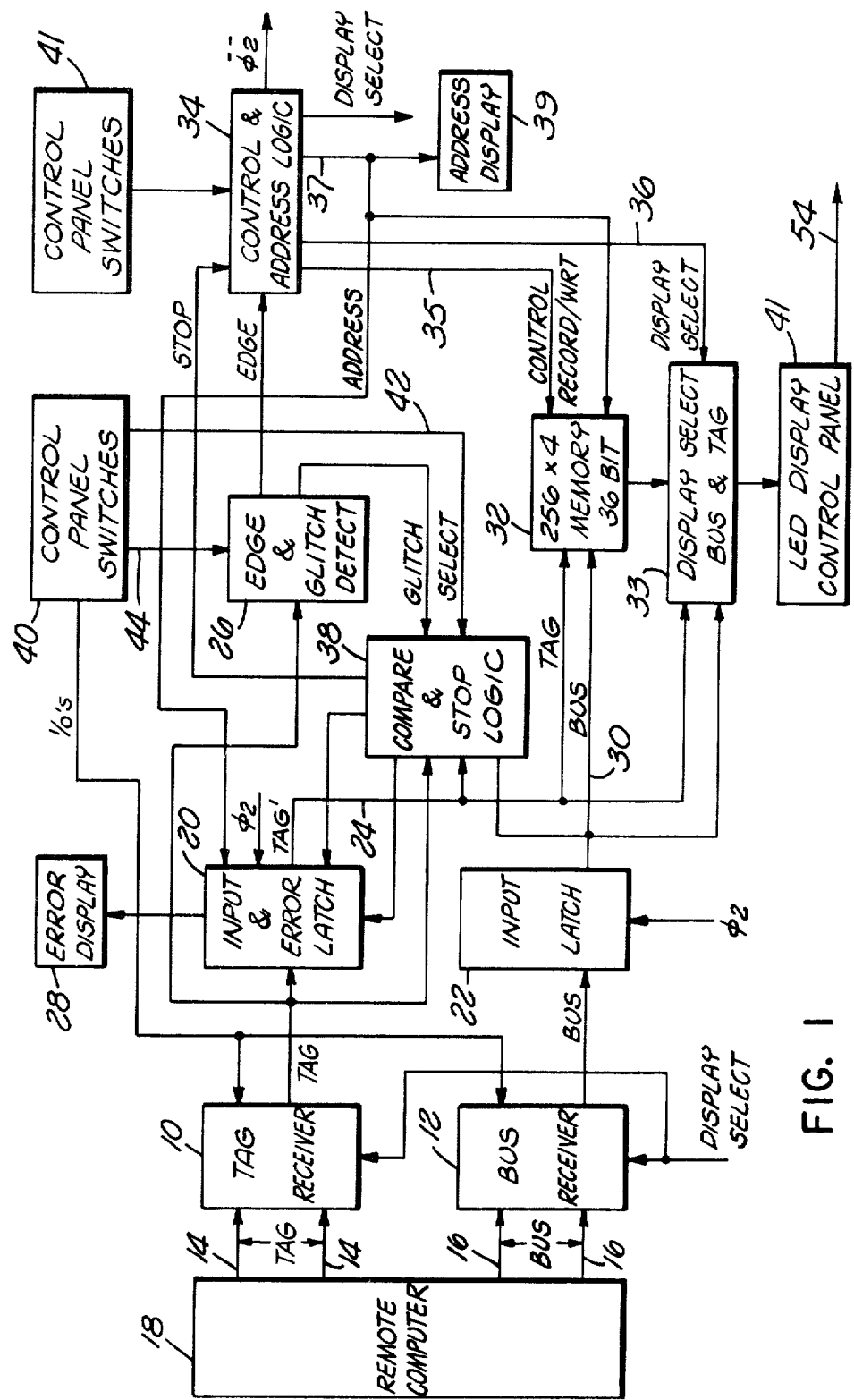
FIG. 1 is a schematic block diagram of the channel monitor device of the present invention.

FIG. 1 is a block diagram of the channel monitor apparatus of the present invention. A pair of conventional receivers 10 and 12, such as the Model No. 8T24, manufactured by Signetics Corporation, Sunnyvale, Calif., are utilized to receive information on Tag and Bus lines 14 and 16, respectively, from remote computer 18. The Tag and Bus lines correspond to the I/O (input/output) channel of computer 18 which are coupled to a locally attached device, such as a video display terminal controller (not shown). The output from Tag receiver 10 is coupled to input and error latch circuit 20 and edge and glitch detect circuit 26 and the output from Bus receiver 12 is coupled to latch circuit 22. The output of latch circuit 20 is coupled over line 24 to compare and stop logic circuit 38, a memory 32 and display select Bus and Tag logic circuit 33. Detect circuit 26, as will be described in more detail hereinafter, starts to record in memory 32 on the positive edge of the detected signal. If this signal is not high for a period of 114 nanoseconds, for example, a glitch detect logic in circuit 26 is set. This, in turn, causes an error to be set in latch 20; the recording to be stopped and error display 28 to be set. If the signal is high for a period equal to or greater than 114 nanoseconds, recording is set and the Tag and Bus signals on lines 24 and 30, respectively, are coupled to the 256×4, 36 bit memory 32.

A control and address logic-block 34 is provided which generates a signal $\phi_2$ which is a 8.69 MHz clock used to set latches 20 and 22; control signals on leads 35 and 36 to control memory 32 and display select Bus and Tag logic 33, respectively, and a memory address signal on lead 37 which is coupled to latch 20, memory 32 and address display 39.

In essence, the channel monitor device of the present invention operates to record I/O channel Tag and Bus signals when operator selected Tag In or Tag Out lines go to a one (1) state. In addition to recording on the one (1) state of operator selected Tag lines, the apparatus also checks the selected Tag lines for glitches, signals in a one (1) state for less than 114 nanoseconds.

A compare and stop logic circuit 38 is provided to compare the selected Tag or Bus signals with a specified data pattern selected by an operator, expected to be generated by the computer, using control panel switches via line 42. The Tag or Bus lines selected for comparison are accomplished via control panel switches 40 via line 44.

Referring in more detail to the function of the control panel switches 40 and 41, the more important functions thereon are now set forth. The controls include a stop select (glitch, compare or error) which stops recording when the selected event occurs; compare select (for selecting desired Tag or Bus lines) and compare data switch; and the record and monitor operating modes. The important displays associated with the channel monitor include error display 28 (indicates a recorded error; error stop and type of error); and memory and error address display 39 and control panel display 41.

Control switch functions also include a Stop +128 switch which, in one position, enables the channel monitor to stop operating on a detected error or, in a second position, to stop on the error plus 128 events. Glitch detection and a detected comparison will also actuate the Stop function (logic to perform these functions are incorporated in block 38). It should be noted that the control switch is only active in the record mode. Compare switches in 40 function to select the data pattern to be compared by setting in a pattern of 1's and 0's with the I/O channel signals during a specified Tag signal period and one applied to detect circuit 38 via lead 42.

Memory address switches associated with panel 41 set the starting addresses in memory 32 for reading or writing in memory when the mode switch is set in the read or write position. As set forth hereabove, the Mode select switch will place the channel monitor into one of five operating modes, only the two important ones being discussed hereinbelow:

(1) Record Modes—this enables the sampling of all Bus and Tag signals with the rise of a selected Tag signal and thus records all lines simultaneously when any one of the selected events or sequences occur. Recording stops when a comparison is made or one of the error conditions occurs.

(2) Monitor Mode—entering this mode will reset the address counter to zero; reset all error detect circuits; reset all compare detect logic and allow monitoring of Bus and Tag signals without recording the events in memory.

Although the apparatus of the present invention can be conditioned to stop recording for a number of reasons, only the two most important reasons will be discussed. In particular, recording stops when:

(1) A glitch on any selected Tag line of less than 114 nanoseconds duration occurs when the glitch detect circuit is enabled; and (2) When the Tag or Bus lines and the selected data pattern compare.

Note that when the channel monitor is in the Monitor position, a real-time indicator of the I/O channel operation is provided with no recording capability.

The apparatus of the present invention is a high speed sequence recorder capable of recording at a rate of 8.64 MHz. The only time period adjustment is the adjustable one-shot that is set for a pulse-repetition time of just less than two (2) basic clock times, 100 nanoseconds.

Figure 7:
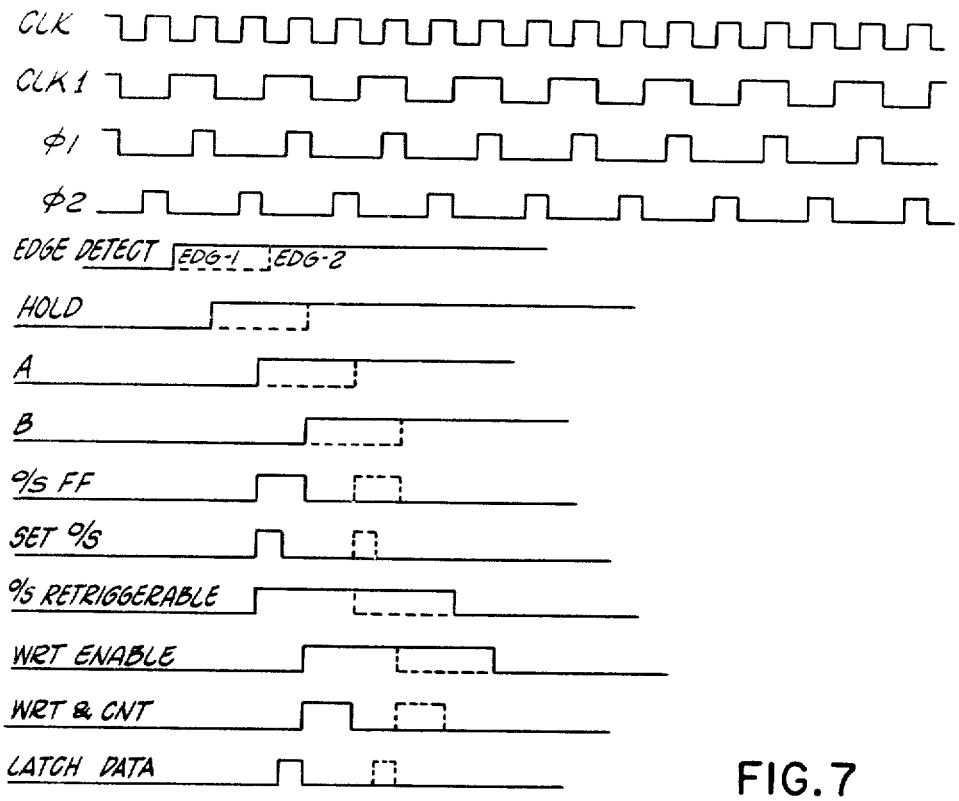
FIG. 7 is a worst case timing diagram respecting a Tag line input and detection of the leading edge.
Figure 8:
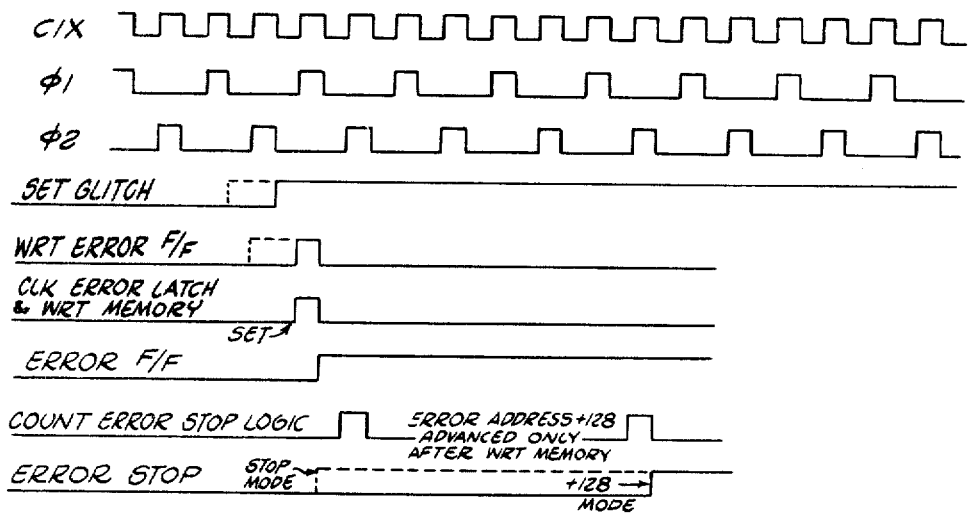
FIG. 8 is a basic timing diagram relating to the functions of FIG. 4.

Four timing requirements are present in the apparatus of the present invention as follows (the timing charts are shown in FIGS. 7 and 8):

(1) Edge Detection and Retriggerable One-Shot.

The Edge Detection circuit is designed to detect the positive excursion of a Tag line that remains positive for longer than 114 nanoseconds. When this condition is met, a pulse is applied to its retriggerable one-shot or timer. The retriggerable one-shot is adjusted for a period of 100 nanoseconds. If another trigger pulse is received prior to the one-shot time out, the one-shot will continue for another 100 nanoseconds.

(2) Glitch Detection.

The Glitch Detection circuit is designed to detect a positive condition of a Tag line that has a duration of <10 nanoseconds and >100 nanoseconds ±12 nanoseconds.

(3) Error Detection.

Inputs to the error detection circuit are from seven sources, only the glitch and compare (and parity) being of interest.

(4) Record Timing.

The record timing is designed to have a record rate maximum of 8.64 MHz. The record cycle is controlled by the retriggerable one-shot and the error detect circuit.

In essence, the channel monitor of the present invention is designed to record asynchronous channel sequences by detecting a signal level of a duration longer than 114 nanoseconds and causing a synchronous record of all Bus and Tag signals. A detected error condition will also cause a synchronous recording of all Bus and Tag signals. The recording occurs on the positive edge of the selected Tag lines. (For the purposes of describing the present invention, it is assumed that any selected signal alone will cause recording.)

Referring back to the block diagram of FIG. 1, in the monitor mode, the Tag receiver 10 is conditioned such that a selected Tag line (signal) is initially being monitored. This signal is coupled to edge and glitch detector 26 which then determines whether or not a glitch is present. If a glitch is present, recording stops. If a glitch is not present, the labeled Tag and Bus signals in latches 20 and 22, respectively, are coupled to memory 32 for recording.

Figure 2:
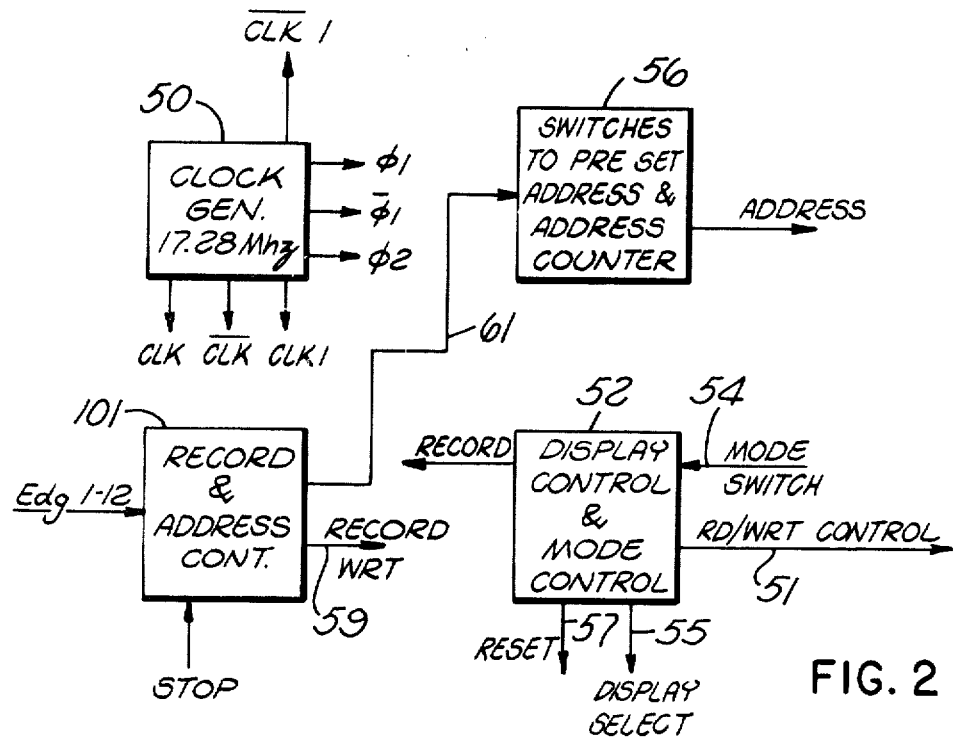
FIG. 2 shows a schematic block diagram of the Display Control and Mode Control circuits.
Figure 3:
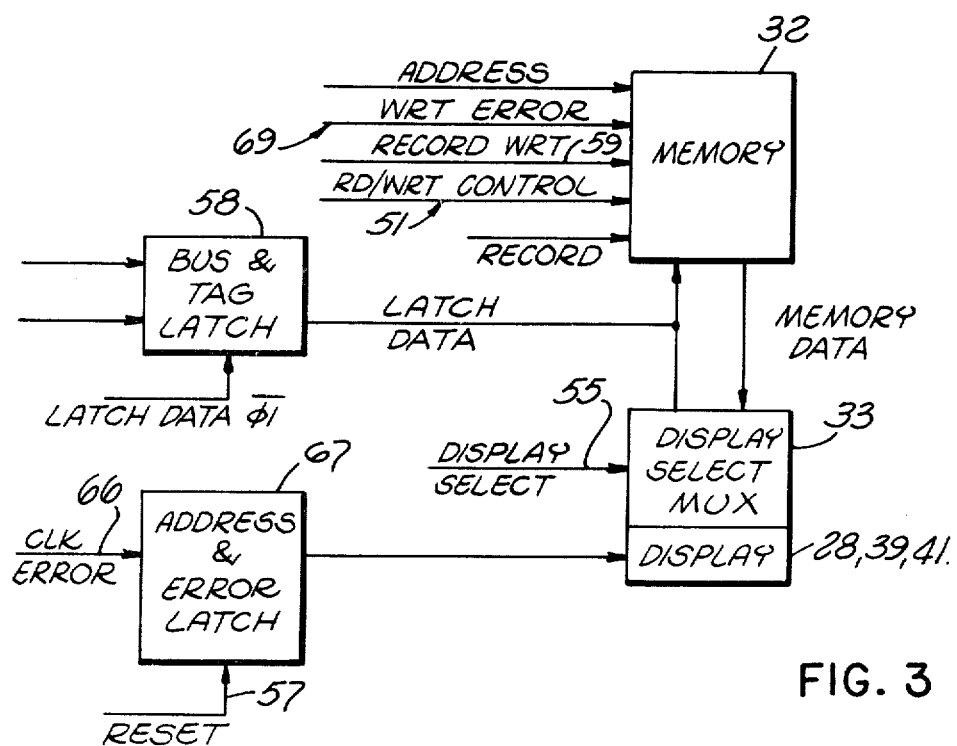
FIG. 3 shows a schematic block diagram of circuits for selecting the data to be displayed.

FIGS. 2 and 3 are control circuits and comprise the logic necessary to generate all clocks and control signals to provide memory write and read at the operating speeds necessary to record channel sequences. Block 50 contains the logic for generating the basic 17.28 MHz clock and the various other clock related signals CLK, $\overline{CLK}$, CLK1, $\overline{CLK1}$, $\phi_1$, and $\phi_2$ (see timing waveforms in FIGS. 7 and 8). Display control logic 52 places the channel monitor in its various modes of operation in response to the mode switch signal on lead 54. During manual RD/WRT mode (FIG. 3), the contents of memory 32 (which is continuously being read by changing address lines) are displayed on display 41 via display select multiplexer 33 as enabled by display select signal on lead 56. During all other modes the display is of the Bus and Tag latched outputs from latch 58. As shown in FIG. 3, the memory address, error address and error latch are always displayed and only reset by the reset switch.

A disc switch in block 40 of FIG. 1 is provided to enable the Halt I/O condition, also known as the Interface Disconnect sequence.

FIG. 2 contains the Display Control and Mode Control circuits which determine by position of the mode switch line 54 from block 41 of FIG. 1 whether the monitor is in record mode or manual RD/WRT mode. The Display Select line 55 goes to FIG. 3 block 33 to select which input is to be displayed, latch data or memory data. Memory data is displayed in RD/WRT modes.

Figure 4:
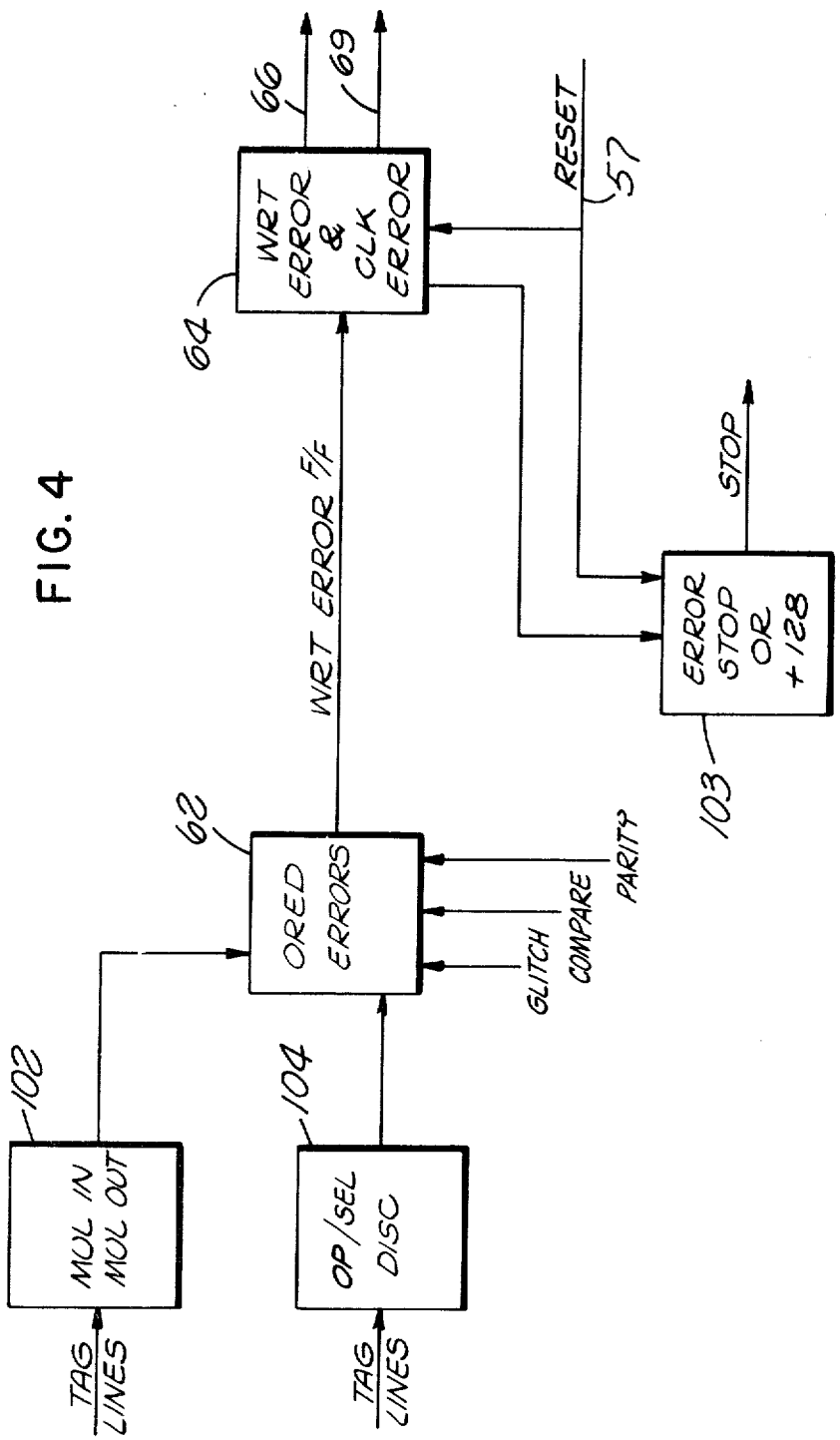
FIG. 4 is the schematic diagram of the address and control logic.

FIG. 4 shows the stop logic portion of block 38 of FIG. 1. The error stop logic functions to "OR" the various monitor errors (glitch, compare and parity) in OR logic block 62 and creates WRT error and CLK error pulses in logic block 64 on lead 66 to latch errors and WRT memory in labels 67 (FIG. 3). Once set, logic circuit 67 can only be reset by the reset switch.

FIG. 4, the block 102 MUL IN, MUL OUT is a check made to determine if multiple TAG IN lines or multiple TAG OUT lines which are true at the same time are by definition an error condition. If so, it is ORED with other error conditions to create WRT error and CLK error in block 64 of FIG. 4.

The block 104 is enabled either by OP/SEL or Disc switches from FIG. 1, block 40. The signal conditions of operational IN TAG and SELECT IN TAG at the CPU 18 are considered an error condition.

Figure 5:
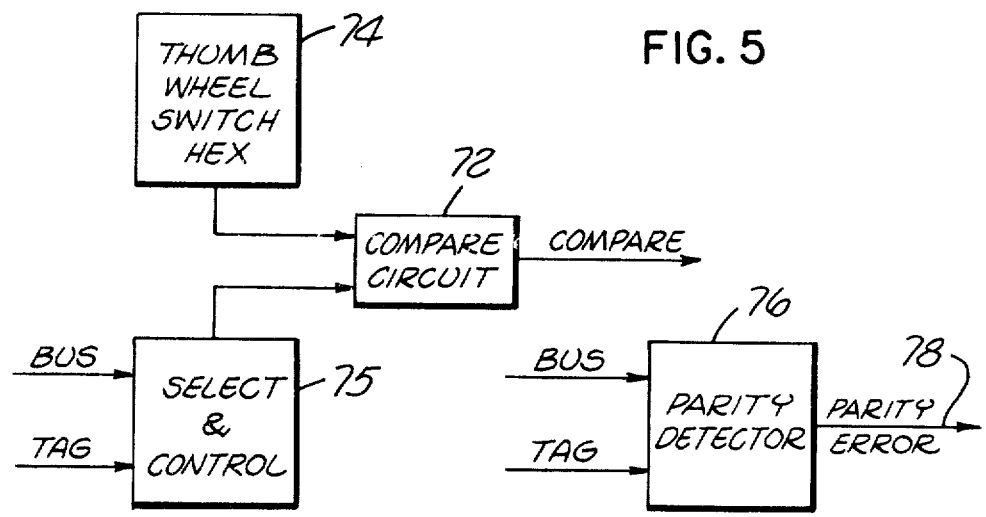
FIG. 5 is the schematic diagram of the error and stop logic.

FIG. 5 shows the compare and parity detect logic portions of the block diagram of FIG. 1. Compare circuit 72 functions to compare the thumbwheel switch setting set by an operator via switch 74 to the Bus In or Bus Out signals at the proper Tag In or Tag Out signal via select and control logic 75. Only one compare condition can be active at any given time. The output of compare circuit 72 is coupled to OR circuit 62 (FIG. 4).

The parity detector logic circuit 76 functions to check parity of Bus In or Bus Out signals during one of the selected Tag In or Tag Out signals. If parity is not detected, a parity error is generated on lead 78 and coupled to OR circuit 62.

Figure 6:
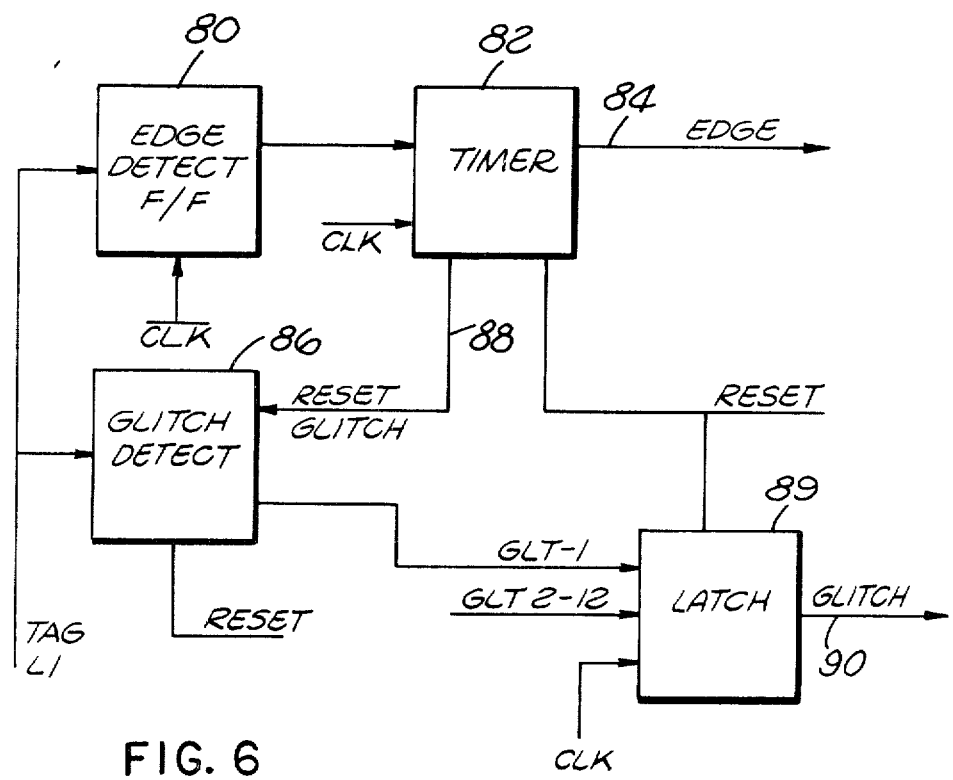
FIG. 6 is the schematic diagram for an edge and glitch detector.

The edge and glitch detect logic circuit portion of the block diagram of FIG. 1 is shown in FIG. 6. The edge detector flip-flop 80 is set when a selected Tag line goes positive and reset when the line goes negative or to zero. The set output of flip-flop 80 is coupled to time 82 which generates a single pulse on lead 84 which is coupled to record and address control logic 58 (FIG. 2) to cause one record cycle to occur and to reset glitch detector 86 via lead 88 if the Tag line signal is of proper duration. If the reset signal from timer 82 is not received by glitch detect 86, glitch detect latch 89 is set and an error condition appears on lead 90 if the glitch enable line is active.

FIG. 7 waveforms concerning the basic worst case timing of a Tag line input and the corresponding detection of the leading edge are depicted. The hold line is the output of the edge detect F/F to the timer 82 of FIG. 6. The O/S FF and the set O/S are a combination which is called edge line 84 of FIG. 6.

The signals WRT enable and O/S retriggerable are internal to block 101 of FIG. 2. Results of these signals are lines 59 (record WRT) and line 61 (count address). The latch data signal $\phi_1$ is used to set the Bus and Tag latches in FIG. 3, block 58. This signal is generated in the clock generator circuit block 50 of FIG. 2.

FIG. 8 is a basic timing diagram relating to FIG. 4. The GLT-1 or GLT 2-12 signals of FIG. 6 set latch block 89 to produce output line 90 Glitch. Glitch is ORED in block 62 of FIG. 4 to generate WRT error F/F which produces WRT error for memory (line 69) and CLK error for address and error latch block 67, FIG. 3. The error F/F of block 103, FIG. 4, is set to generate the stop line to block 101 of FIG. 2.

All twelve edge outputs from the Tag lines are ORED together at the one-shot circuit in logic block 57 (FIG. 2) to generate a single record cycle on lead 59 and to advance the address in address counter 56 for each edge detected via lead 61.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. Apparatus coupled to the I/O channel between a digital computer and a locally attached remote device for monitoring, in real time, the activities of said channel, said channel including a plurality of data and command lines comprising:

first means for selecting which of said lines are to be monitored;

second means coupled to said first means to determine the period of the signals on said selected lines;

and third means including a memory for recording said signals on said selected lines if the period of all the signals on said selected lines is greater than a first predetermined period.

2. Apparatus according to claim 1 in which said third means includes circuits for inhibiting said recording for any of said signals greater in duration than a second predetermined period.

3. Apparatus according to claim 1 in which said I/O channel comprises a plurality of Bus lines and a plurality of Tag lines, separate digital receivers responsive discretely to each of said pluralities of Bus and Tag lines, a discrete input and error latch circuit responsive to each of said receivers and means for controlling the latching of said latch circuits to respond to a selected one of said lines in each of said Bus and Tag line groups.

4. Apparatus according to claim 2 in which said I/O channel comprises a plurality of Bus lines and a plurality of Tag lines, separate digital receivers responsive discretely to each of said pluralities of Bus and Tag lines, a discrete input and error latch circuit responsive to each of said receivers and means for controlling the latching of said latch circuits to respond to a selected one of said lines in each of said Bus and Tag line groups.

5. Apparatus according to claim 3 or 4 including fourth means responsive to said Tag receiver for edge and glitch detection of said selected Tag line signals as selected by said first means.

6. Apparatus according to claim 1, 2 or 3 in which sixth means are included for displaying at least one of said Bus or Tag line signals recorded in said memory as a function of control by said first means.

* * * * *